United States Patent
Asami

(10) Patent No.: US 8,737,799 B2
(45) Date of Patent: May 27, 2014

(54) DISPLAY SYSTEM AND IMAGE REPRODUCTION DEVICE

(75) Inventor: Tomonobu Asami, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 103 days.

(21) Appl. No.: 13/387,444

(22) PCT Filed: Jun. 15, 2010

(86) PCT No.: PCT/JP2010/060135
§ 371 (c)(1),
(2), (4) Date: Jan. 27, 2012

(87) PCT Pub. No.: WO2011/013457
PCT Pub. Date: Feb. 3, 2011

(65) Prior Publication Data
US 2012/0128315 A1    May 24, 2012

(30) Foreign Application Priority Data
Jul. 27, 2009    (JP) ................................. 2009-174684

(51) Int. Cl.
*H04N 5/765* (2006.01)

(52) U.S. Cl.
USPC ........................... 386/201; 386/200; 386/230

(58) Field of Classification Search
USPC ......... 386/230, 235, 239, 353–356, 200, 201;
345/1.1, 698; 348/207.99; 725/153
See application file for complete search history.

(56) References Cited

U.S. PATENT DOCUMENTS

| | | | |
|---|---|---|---|
| 6,839,061 B1 | 1/2005 | Kamakura et al. | |
| 2002/0059648 A1* | 5/2002 | Ohba et al. | 725/153 |
| 2003/0016223 A1 | 1/2003 | Miyauchi | |
| 2004/0046706 A1* | 3/2004 | Lim et al. | 345/1.1 |
| 2004/0207618 A1 | 10/2004 | Williams et al. | |
| 2005/0093982 A1* | 5/2005 | Kuroki | 348/207.99 |
| 2006/0123170 A1 | 6/2006 | Mukherjee | |
| 2007/0181678 A1 | 8/2007 | Nilsson et al. | |

(Continued)

FOREIGN PATENT DOCUMENTS

| | | |
|---|---|---|
| DE | 3837313 A1 | 5/1989 |
| EP | 1 826 748 A1 | 8/2007 |

(Continued)

OTHER PUBLICATIONS

U.S. Appl. No. 13/386,449, filed Jan. 23, 2012, Asami.

(Continued)

*Primary Examiner* — Hung Dang
*Assistant Examiner* — Mishawn Dunn
(74) *Attorney, Agent, or Firm* — Oblon, Spivak, McClelland, Maier & Neustadt, L.L.P.

(57) ABSTRACT

Image reproduction devices and a management device each hold moving image data. The management device goes into a reproduction standby state in which the moving image data can be reproduced and instructs the image reproduction devices to go into the reproduction standby state, by cascade communication. The management device starts reproduction of the moving image data and instructs the image reproduction devices to start reproduction of the moving image data, by broadcast communication. The management device periodically broadcasts synchronization information. The image reproduction devices use the synchronization information to specify a frame number of a frame displayed on the management device. Frames corresponding to the specified frame number are displayed on the display parts.

12 Claims, 13 Drawing Sheets

(56) References Cited

U.S. PATENT DOCUMENTS

2008/0211825 A1    9/2008   Sunakawa et al.
2010/0328615 A1   12/2010   Ikeda et al.
2011/0205500 A1    8/2011   Ikeda et al.

FOREIGN PATENT DOCUMENTS

| JP | 10 260665   | 9/1998  |
| JP | 2000 330535 | 11/2000 |
| JP | 2001 100683 | 4/2001  |
| JP | 2003 030641 | 1/2003  |
| JP | 2005 86592  | 3/2005  |
| JP | 2007 289636 | 11/2007 |
| JP | 2009 122412 | 6/2009  |

OTHER PUBLICATIONS

International Search Report Issued Jul. 13, 2010 in PCT/JP10/60135 Filed Jun. 15, 2010.

* cited by examiner

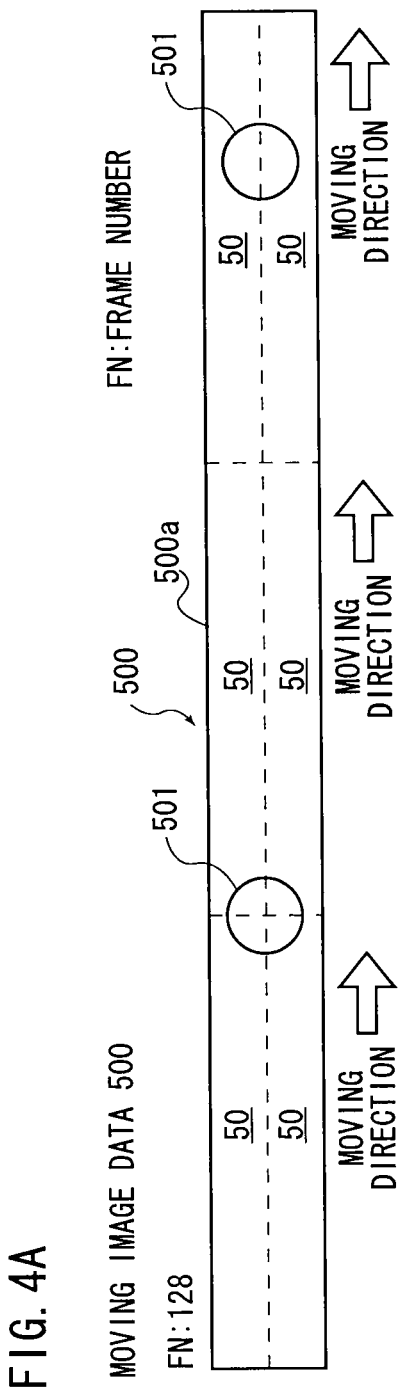

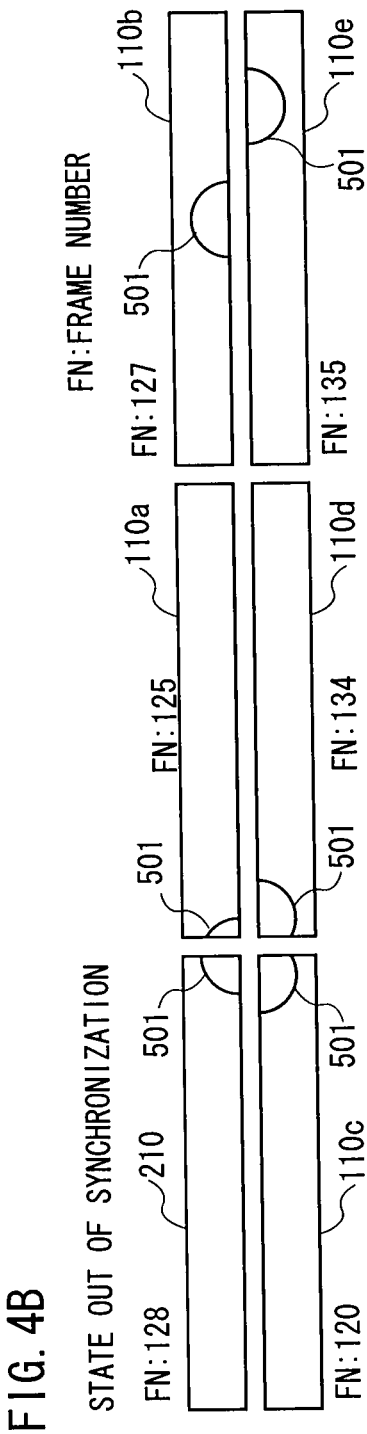

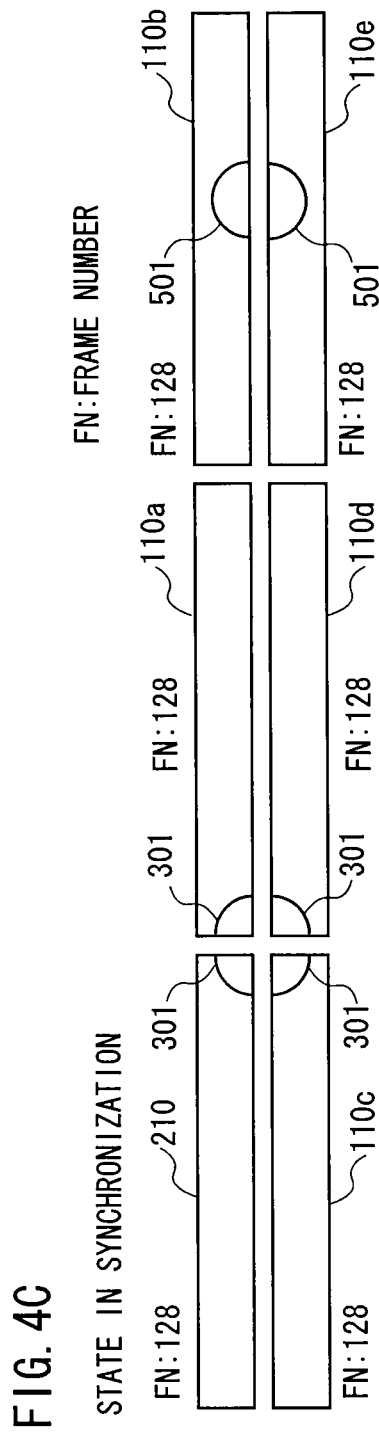

FIG. 8

DISTRIBUTION DESTINATION
INFORMATION                    46

| FILE NAME | IDENTIFYING INFORMATION |
|-----------|------------------------|
| fileA.mpg | 10a |
| fileB.mpg | 10b |
| fileC.mpg | 10c |
| fileD.mpg | 10d |
| fileE.mpg | 10e |
| fileF.mpg | 20 |

DISPLAY SYSTEM AND IMAGE REPRODUCTION DEVICE

TECHNICAL FIELD

The present invention relates to a display system constituted of thin display devices each using liquid crystal display panels or the like.

BACKGROUND ART

In retail stores such as supermarkets, convenience stores, and the like, generally, display racks are placed in the stores and commercial goods are displayed on the display racks. Further, for the purpose of sales promotion of the goods displayed on the display racks, a technique called "electronic POP (Point Of Purchase)" has been conventionally used.

[Patent Document 1] Japanese Patent Application Laid Open Gazette No. 2001-100683

[Patent Document 2] Japanese Patent Application Laid Open Gazette No. 2007-289636

Patent Document 1 discloses an electronic POP apparatus using a thin display panel such as a liquid crystal display panel or the like. In the electronic POP apparatus disclosed in Patent Document 1, an advertising video image is displayed on the liquid crystal display panel or the like by reproducing moving image data or the like stored in a storage medium. For using the electronic POP apparatus of Patent Document 1, however, another space for setting the electronic POP apparatus is needed separately from the space for displaying the commercial goods.

Patent Document 2 discloses a display rack on which a video image for electronic POP can be displayed. A projector is set inside the display rack and a transmission screen is attached to a front surface of a shelf board on which the commercial goods are placed. An advertising video image is displayed entirely on the display rack by displaying the advertising video image projected from the projector on the screen. The display rack of Patent Document 2 allows display of the advertising video image thereon, not requiring any space for setting an electronic POP apparatus, and it is thereby possible to efficiently use the salesrooms in the retail stores.

Electronic POP systems in each of which one video image is displayed on a plurality of display devices have been also used. In order to synchronize video images displayed on the display devices, such an electronic POP system needs a content reproduction device for generating frames to be displayed on the display devices, respectively, from moving image data and distributing the frames to the display devices. Therefore, the electronic POP system using a plurality of display devices disadvantageously has a complicated configuration, and this arises a problem that it is difficult to lower the price thereof.

DISCLOSURE OF INVENTION

The present invention is intended for a display system. According to the present invention, the display system includes a first image reproduction device for reproducing first moving image data and a second image reproduction device for reproducing second moving image data, which can be communicated with the first image reproduction device, and in the display system of the present invention, the first image reproduction device and the second image reproduction device each comprise a storage part for storing therein moving image data to be reproduced by the device itself, a decoder for decoding the moving image data stored in the storage part, to thereby generate a frame, and a display part for displaying the frame thereon in the order of frame number, the second image reproduction device further comprises a synchronization information transmitting part for transmitting synchronization information including information specifying a frame number of a reference frame displayed on the display part of the second image reproduction device to the first image reproduction device by unidirectional communication, and the first image reproduction device further comprises a frame adjustment part for specifying the frame number of the reference frame on the basis of the synchronization information and displaying a frame corresponding to the frame number specified thus on the display part.

The display system needs no device other than the first image reproduction device and the second image reproduction device and can synchronize the frame numbers of the pieces of moving image data reproduced by these devices, respectively. Therefore, it is possible to simplify the configuration of the display system.

According to another preferred embodiment, the display system further includes a third image reproduction device for reproducing third moving image data, and in the display system of another preferred embodiment, the synchronization information transmitting part (251) includes a broadcast communication part for broadcasting the synchronization information to the first image reproduction device and the third image reproduction device by unidirectional communication.

It is thereby possible to easily synchronize the pieces of moving image data reproduced by three or more image reproduction devices.

Therefore, it is an object of the present invention to provide a technique for facilitating reduction in the cost of a display system which displays one video image by using a plurality of display devices.

These and other objects, features, aspects and advantages of the present invention will become more apparent from the following detailed description of the present invention when taken in conjunction with the accompanying drawings.

BRIEF DESCRIPTION OF DRAWINGS

[FIG. 4A] is a view showing moving image data used for displaying a video image on the whole of the display system;

[FIG. 4B] is a view showing a state where the pieces of moving image data are reproduced out of synchronization;

[FIG. 4C] is a view showing a state where the pieces of moving image data are reproduced in synchronization;

[FIG. 8] is a view showing distribution destination information;

BEST MODE FOR CARRYING OUT THE INVENTION

{Configuration and Use of Display System}

Figure 1:
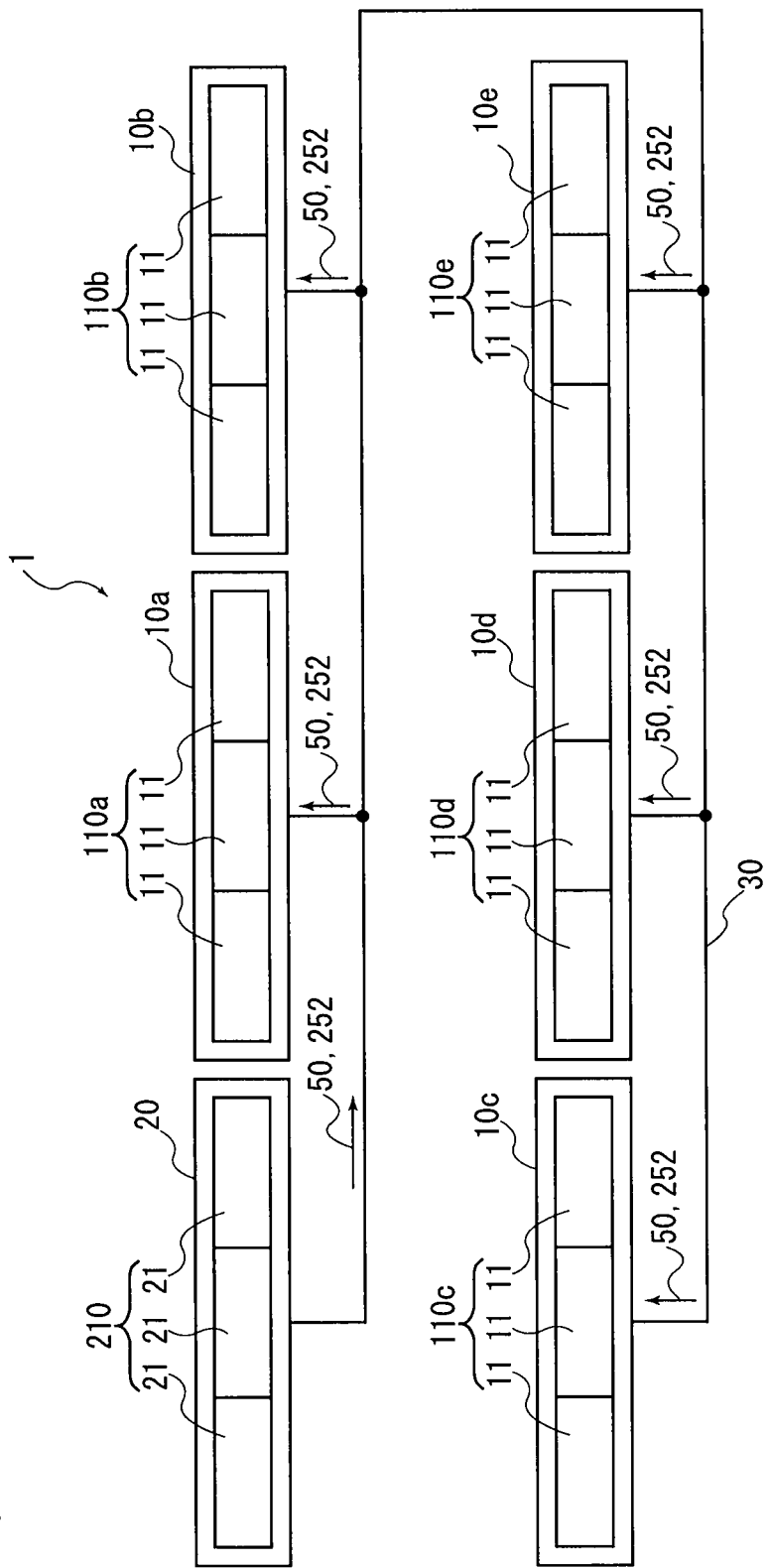
[FIG. 1] is a schematic diagram showing a configuration of a display system in accordance with a preferred embodiment of the present invention.

Hereinafter, with reference to figures, the preferred embodiment of the present invention will be discussed. FIG. 1 is a schematic diagram showing a display system 1 in accordance with the preferred embodiment. The display system 1 comprises image reproduction devices 10a, 10b, 10c, 10d, and 10e, a management device 20, and a communication cable 30. The image reproduction devices 10a to 10e and the management device 20 each have a function for reproducing moving image data 50.

The display system 1 can be used as an electronic POP system and can display one video image by using the image reproduction devices 10a to 10e and the management device 20. In this case, The pieces of moving image data 50 held by the image reproduction devices 10a to 10e and the management device 20 are obtained by dividing one piece of moving image data 500 (see FIG. 4A) by six. In order for these devices to reproduce the pieces of moving image data 50 in synchronization, the management device 20 periodically sends synchronization information 252 to the image reproduction devices 10a to 10e.

The image reproduction devices 10a to 10e have display parts 110a to 110e, respectively, and the display parts 110a to 110e are each constituted of liquid crystal display panels 11, 11, and 11. In each of the display parts 110a to 110e, the three liquid crystal display panels 11 are aligned in a horizontal scan direction and constitute one virtual display panel. In other words, the three liquid crystal display panels 11 displays thereon a reproduced video image of the moving image data 50 on the whole.

The image reproduction devices 10a to 10e have the same configuration. For this reason, when common discussion on the image reproduction devices 10a to 10e will be made, the image reproduction devices are generally referred to as the image reproduction device(s) 10, not individually referred to as the image reproduction devices 10a, 10b, . . . , and 10e.

The management device 20 also has a function for managing the image reproduction devices 10 as well as the function for reproducing the moving image data 50. Specifically, the management device 20 performs distribution of the moving image data 50 to the image reproduction devices 10, gives an instruction for reproduction of the moving image data 50 to the image reproduction devices 10, and so on. The management device 20 has a display part 210 constituted of three liquid crystal display panels 21, like the image reproduction devices 10.

The communication cable 30 is a cable which accommodates a standard such as RS-485 or the like and connects the image reproduction devices 10 and the management device 20 to each other.

{Appearance of Image Reproduction Device 10}

Figure 2:
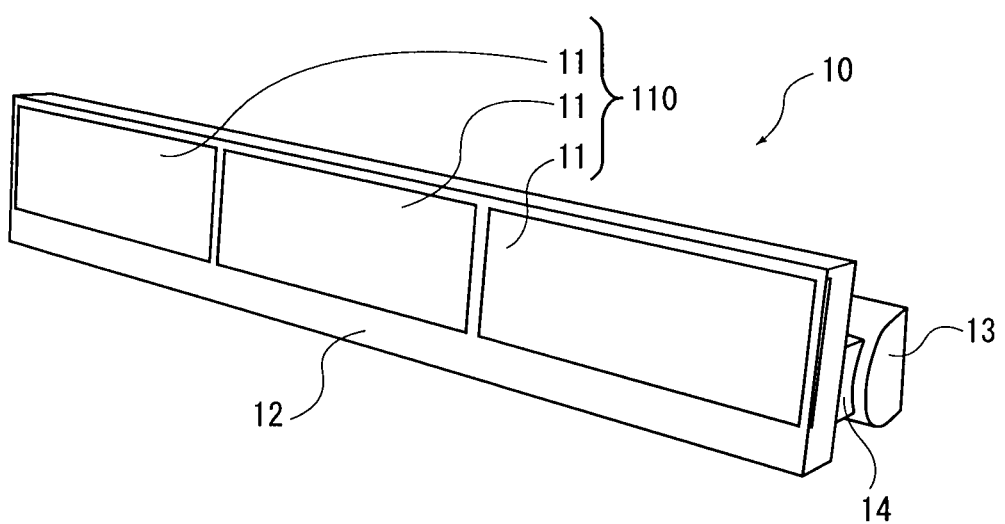
[FIG. 2] is a perspective view of an image reproduction device.

FIG. 2 is a perspective view of the image reproduction device 10. The image reproduction device 10 further comprises a housing 12, an attachment part 13, and a tilt control part 14 as well as the three liquid crystal display panels 11. The appearance of the management device 20 is the same as that of the image reproduction device 10, except that the management device 20 further comprises a memory card slot 26 (see FIG. 6).

The housing 12 accommodates a control part 15 (see FIG. 5) of the image reproduction device 10 and fixes the three liquid crystal display panels 11 on the same plane. The attachment part 13 fixes the image reproduction device 10. The tilt control part 14 controls the orientation of a display surface of the liquid crystal display panel 11.

{Attachment of Image Reproduction Devices 10 and Management Device 20}

Figure 3:
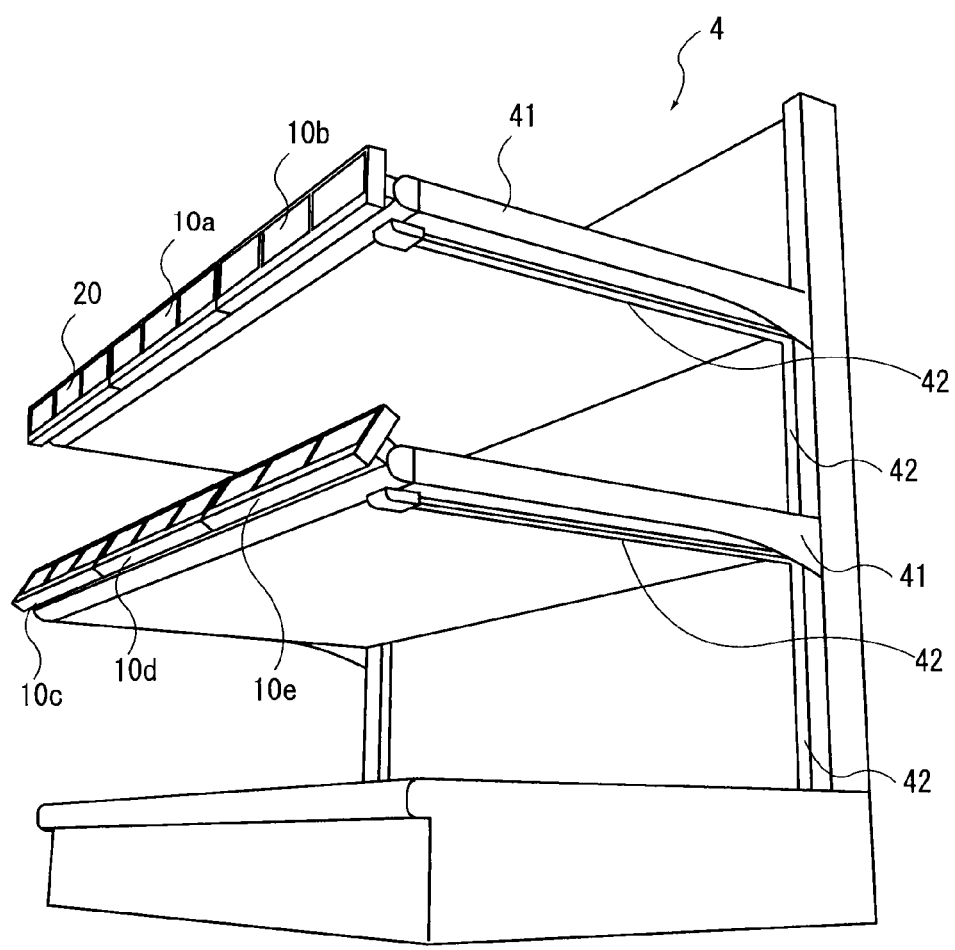
[FIG. 3] is a view showing an exemplary state where the image reproduction devices and a management device are attached.

FIG. 3 is a view showing an exemplary use of the display system 1. The image reproduction devices 10 and the management device 20 are attached to front surfaces of shelf boards 41 of a display rack 4 which is used for display of commercial goods. On the upper shelf board 41, the management device 20, the image reproduction device 10a, and the image reproduction device 10b are attached in this order from the back thereof On the lower shelf board 41, the image reproduction devices 10c, 10d, and 10e are attached in this order from the back thereof Inside a wiring cover 42 which is attached to a lower surface of each shelf board 41, accommodated are the communication cable 30 and a power line for supplying power to the image reproduction devices 10 and the management device 20.

By attaching the image reproduction devices 10 and the management device 20 to the display rack 4, an advertising video image of commercial goods is displayed on the whole of the display rack 4. As shown in FIG. 3, by using the tilt control part 14, the orientations of the display parts of the image reproduction devices 10 and the management device 20 can be controlled to be so angled as to be easily viewed by customers. The display system 1 attached to the display rack 4 can thereby display a clear video image and this increases the effect of sales promotion.

In order to suit to a limited space such as the front surface of the shelf board 41 or the like, the image reproduction devices 10 and the management device 20 have elongated display parts 110 and 210 each constituted of a plurality of liquid crystal display panels 11. Therefore, since the display system 1 does not need to use any liquid crystal display panel suited to the size of the front surface of the shelf board 41, it is thereby possible to achieve substantial reduction in the cost.

{Overview of Reproduction of Moving Image Data 50}

Next, an overview of reproduction of the moving image data 50 will be discussed. As content data to be used for display of one video image on the whole of the display system 1, moving image data 500 is generated. The moving image data 500 is divided into six pieces of moving image data 50 in accordance with display areas of the image reproduction devices 10 and the management device 20.

FIG. 4A is a view showing a frame 500a of the moving image data 500. The frame 500a shown in FIG. 4A corresponds to a frame number 128, in which circles 501 and 501 are drawn. The circles 501 and 501 are moved from the left side to the right side of the paper as the reproduction proceeds.

By dividing the frame 500a into the six areas, six pieces of moving image data 50 are generated. The management device 20, the image reproduction device 10a, and the image reproduction device 10b correspond to the left side area, the center area, and the right side area on the upper row of the frame 500a, respectively. The image reproduction device 10c, the image reproduction device 10d and the image reproduction device 10e correspond to the left side area, the center area, and the right side area on the lower row of the frame 500a, respectively. The image reproduction devices 10 and the management device 20 hold the pieces of moving image data 50 corresponding to the respective areas.

The image reproduction devices 10 and the management device 20 decode the respective pieces of moving image data 50, to thereby generate the frames, and display the frames in the order of the frame number. Each frame is updated at a frequency of 30 frames or the like per second on the basis of a clock signal generated by a crystal oscillator included in each of the devices. Since the characteristics of the crystal oscillators included in the devices vary, however, the timings for updating the frame in the devices are not completely coincident.

Immediately after the reproductions of the moving image data 50 in the image reproduction devices 10 and the management device 20 are started at the same time, the difference in the timing for updating the frame among the devices is very small, e.g., about a few milliseconds. As the reproductions of the moving image data 50 proceed, the difference in the update timing becomes larger. As a result, there occurs a difference among the frame numbers of the frames displayed on these devices.

FIG. 4B is a view showing the moving image data 500 displayed on the whole of the display rack 4 with the difference in the frame number. When there occurs a difference among the frame numbers of the frames displayed on the devices, the frames in which the respective positions of the circles 501 are different are displayed on the display parts 110a to 110e and 210. As a result, the video image displayed on the whole of the display rack 4 lacks a sense of unity.

Then, the management device 20 periodically sends the synchronization information 252 to the image reproduction devices 10a to 10e. The synchronization information 252 includes information specifying a frame number of a frame displayed on the management device 20 and a time stamp indicating the display time of the frame. On the basis of the synchronization information 252, each of the image reproduction devices 10 synchronizes a frame number of a frame displayed on the display part 110 thereof with the frame number specified by using the synchronization information 252. The image reproduction devices 10 and the management device 20 can thereby display the frames of the same frame number, as shown in FIG. 4C. Therefore, the display system 1 can display a unified video image on the whole of the display rack 4.

{Functional Constitution of Image Reproduction Device 10}

Figure 5:
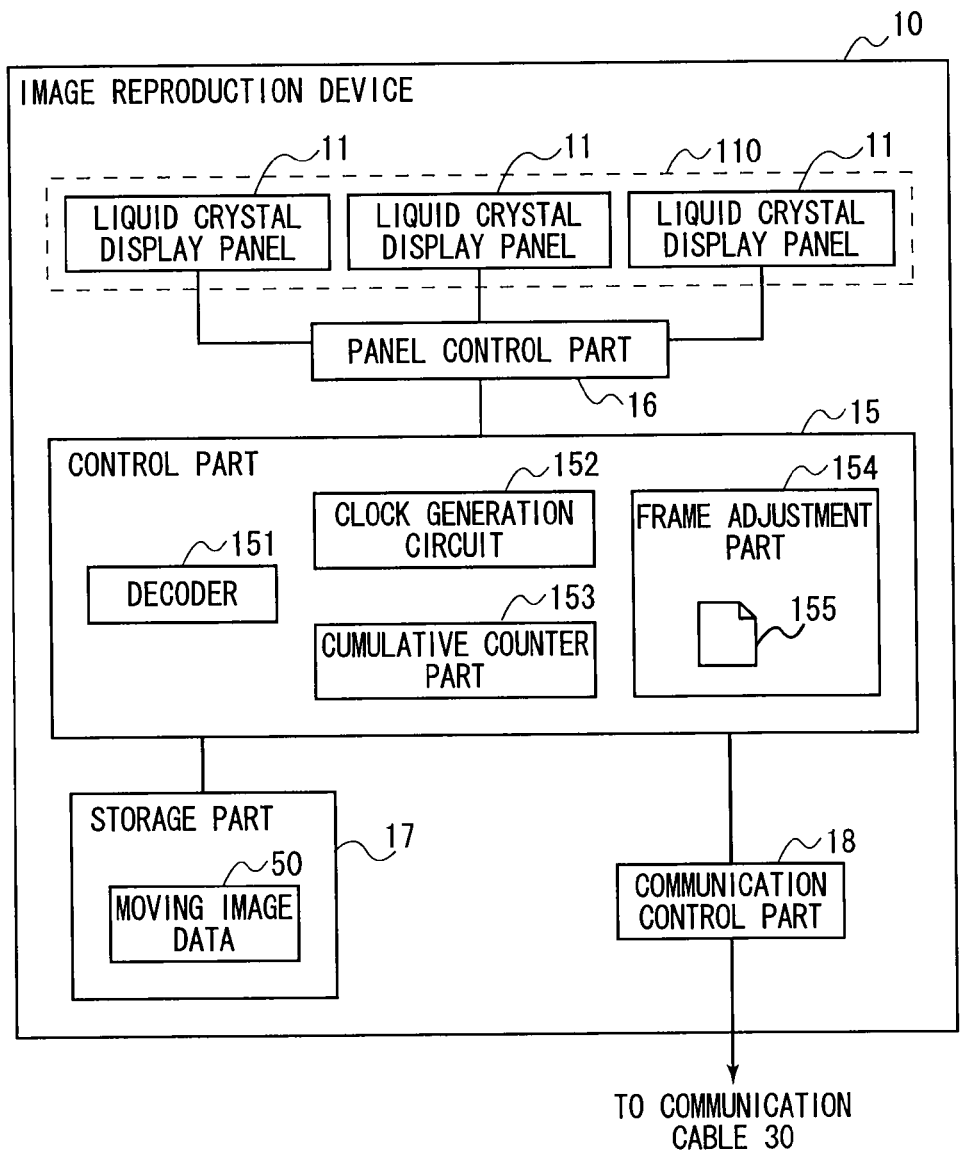
[FIG. 5] is a block diagram showing a functional constitution of the image reproduction device.

FIG. 5 is a block diagram showing a functional constitution of the image reproduction device 10. The image reproduction device 10 comprises a control part 15, a panel control part 16, a storage part 17, and a communication control part 18 as well as the display part 110.

The control part 15 performs a general control of the image reproduction device 10. The control part 15 comprises a decoder 151, a clock generation circuit 152, a cumulative counter part 153, and a frame adjustment part 154.

The decoder 151 decodes the moving image data 50 stored in the storage part 17, to thereby generate a frame. The clock generation circuit 152 incorporates a crystal oscillator (not shown) to generate a clock signal. The cumulative counter part 153 cumulatively counts the clock signal from the time when the image reproduction device 10 starts reproduction of the moving image data 50.

The frame adjustment part 154 uses cumulative count information 155 and the synchronization information 252 received from the management device 20 to specify a frame number of a frame displayed on the management device 20. The cumulative count information 155 is information in which a cumulative count value obtained by the cumulative counter part 153 is recorded. The panel control part 16 is notified of the frame number which is specified by the frame adjustment part 154.

The panel control part 16 counts the clock signal and updates the frame to be displayed on the display part 110 every time when the count value of the clock signal reaches an update count value. In a normal state, the frame is displayed on the display part 110 in the order of the frame number. When the frame adjustment part 154 notifies the panel control part 16 of the frame number, the panel control part 16 displays a frame corresponding to the notified frame number on the display part 110.

The storage part 17 is a flash memory or the like and stores the moving image data 50 therein. The communication control part 18 performs serial communication on the basis of the standard of RS-485.

{Functional Constitution of Management Device 20}

Figure 6:
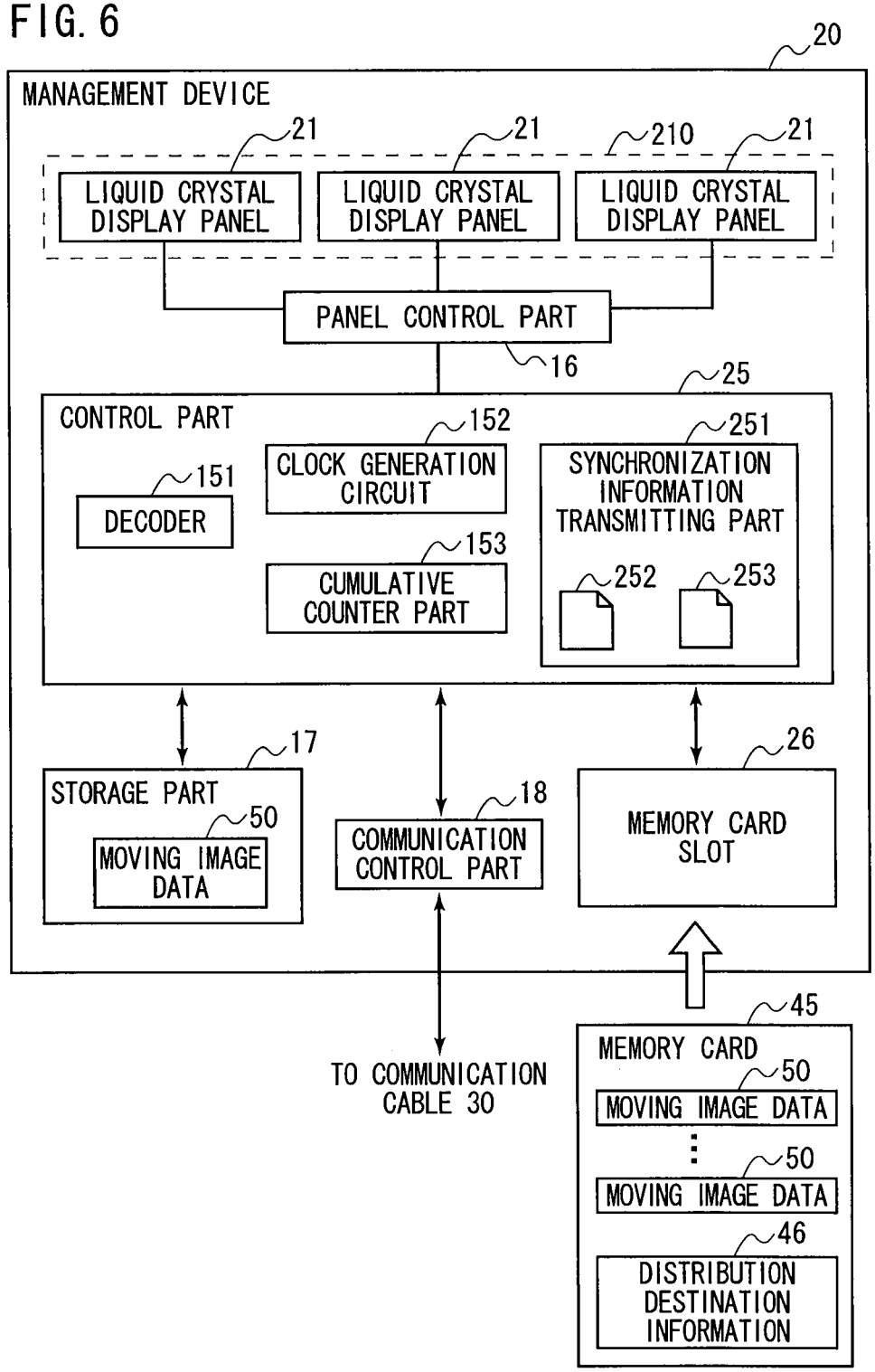
[FIG. 6] is a block diagram showing a functional constitution of the management device.

FIG. 6 is a block diagram showing a functional constitution of the management device 20. Constituent elements identical to those of the image reproduction device 10 are represented by the same reference signs and discussion thereof will be omitted.

The management device 20 further comprises the panel control part 16, the storage part 17, the communication control part 18, a control part 25, and a memory card slot 26 as well as the display part 210.

The control part 25 performs a general control of the management device 20. The control part 25 comprises the decoder 151, the clock generation circuit 152, the cumulative counter part 153, and a synchronization information transmitting part 251.

The synchronization information transmitting part 251 periodically generates the synchronization information 252 and broadcasts the synchronization information 252 to the image reproduction devices 10. The synchronization information transmitting part 251 holds the cumulative count value at the last frame update as reference count information 253. The synchronization information 252 includes the reference count information 253 and a time stamp indicating the last frame update time.

Into the memory card slot 26, a memory card 45 is inserted. In the memory card 45, the pieces of moving image data 50, 50, . . . and distribution destination information 46 are stored. The number of moving image data 50 to be stored in the memory card 45 corresponds to the number of the image reproduction devices 10 and the management device 20 (i.e., six). The distribution destination information 46 is information associating each moving image data 50 with the (destination) device to which the moving image data 50 is distributed.

{Operation of Display System 1}

Hereinafter, as to operations of the display system 1, (1) communication modes used in the display system 1, (2) distribution of the moving image data 50, (3) start of reproduction of the moving image data 50, and (4) display of the moving image data 50 in synchronization will be discussed in this order.

(1) Communication Modes used in Display System

The management device 20 performs distribution of the moving image data 50, gives an instruction for starting reproduction of the moving image data 50, and sends the synchronization information 252 to the image reproduction devices 10. For efficient communication with the image reproduction devices 10, the management device 20 performs either cascade communication or broadcast communication depending on the purpose of communication.

The cascade communication is bidirectional communication between the management device 20 and each of the image reproduction devices 10. The cascade communication is used when the management device 20 distributes the moving image data 50 having a large data size. The cascade communication is used also when the management device 20 requires the image reproduction device 10 to transmit status information thereto. In other words, the cascade communication is one-to-one communication, and therefore, the management device 20 cannot simultaneously transmit data to a plurality of image reproduction devices 10.

The broadcast communication is unidirectional communication from the management device 20 to the image reproduction devices 10 and used when the management device 20 transmits data to all the image reproduction devices 10 at the same time. In other words, the broadcast communication is used when the management device 20 controls the operation timing of all the image reproduction devices 10. As exemplary cases for controlling the operation timing, there are cases where the management device 20 gives an instruction for starting reproduction to all the image reproduction devices 10 and where the management device 20 sends the synchronization information 252 to all the image reproduction devices 10.

The cascade communication and the broadcast communication are performed via the communication cable 30. For this reason, the management device 20 performs time sharing control of the cascade communication and the broadcast communication in order to prevent communications from being performed by the two communication modes at the same time.

(2) Distribution of Moving Image Data 50

The management device 20 distributes the moving image data 50 stored in the memory card 45 to one of the image reproduction devices 10 on the basis of the distribution destination information 46. It is thereby possible to simplify the operation of storing the moving image data 50 in each of these devices.

Figure 7:
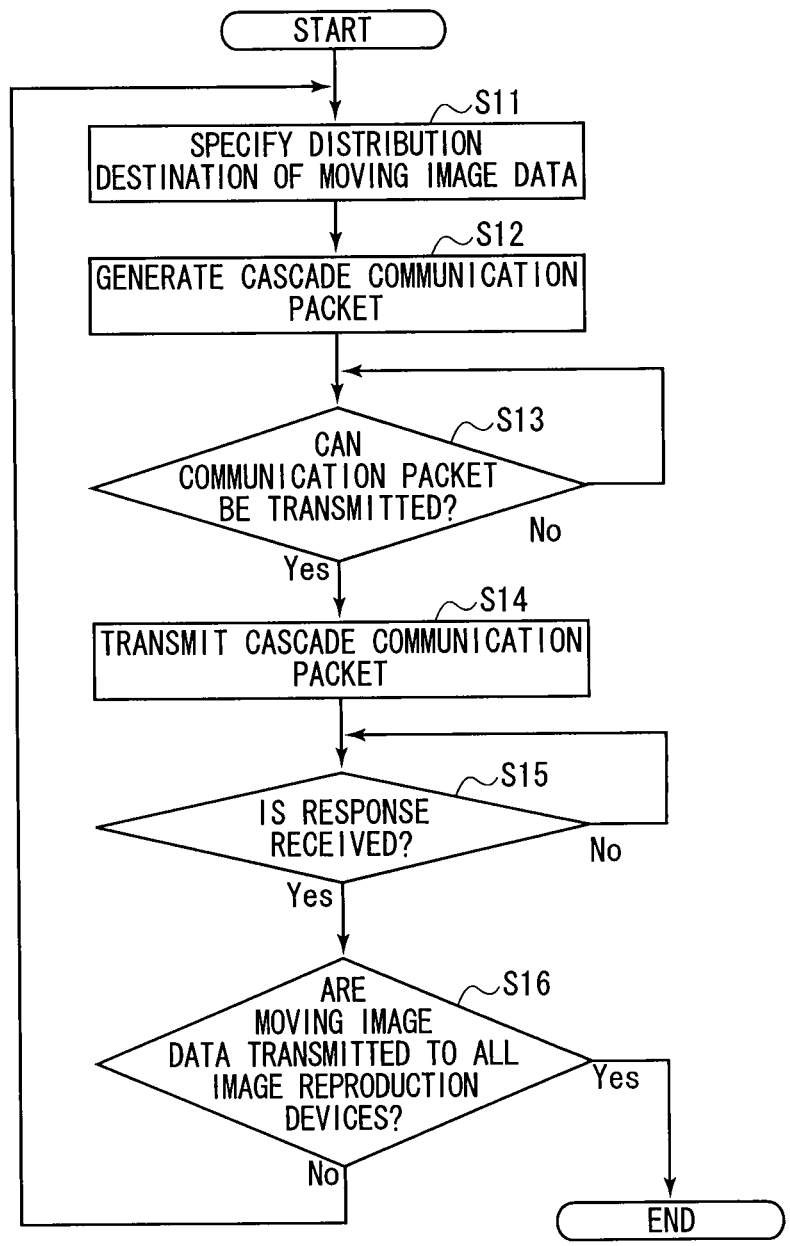
[FIG. 7] is a flowchart showing an operation flow for distributing moving image data.

FIG. 7 is a flowchart showing an operation flow of the management device 20 for distributing the moving image data 50. As an initial state, no moving image data 50 is stored in the storage part 17 of each of the image reproduction devices 10 and the management device 20.

The management device 20 starts the operation shown in the flowchart of FIG. 7 when the memory card 45 is inserted into the memory card slot 26. The management device 20 specifies a distribution destination of the moving image data 50 stored in the memory card 45 on the basis of the distribution destination information 46 (Step S11). FIG. 8 is a view showing an example of distribution destination information 46. For example, a file name "fileA.mpg" is associated with identifying information "10a" of the image reproduction device 10a. The respective identifying information of the image reproduction devices 10b to 10e are "10b" to "10e" and the identifying information of the management device 20 is "20". The management device 20 specifies the image reproduction device 10a as the distribution destination of the moving image data 50 having a file name "fileA.mpg".

In order to transmit the moving image data 50 with the file name "fileA.mpg" to the image reproduction device 10a, the management device 20 generates a cascade communication packet 55 (Step S12).

Figure 9:
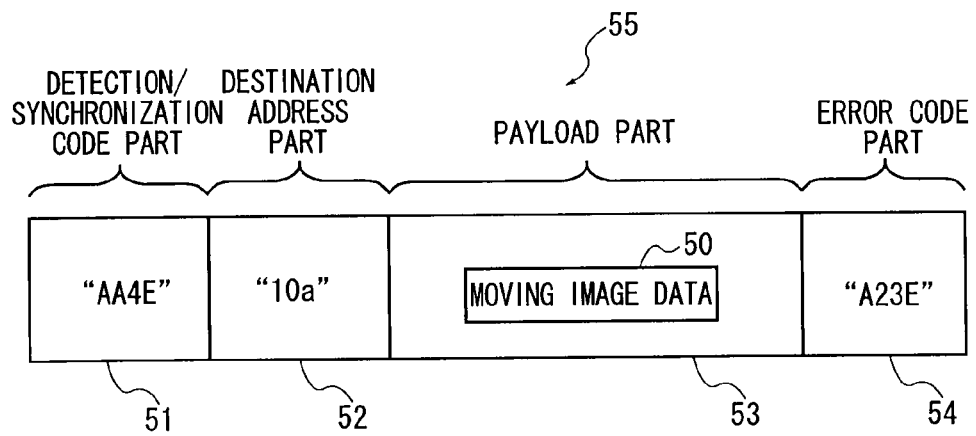
[FIG. 9] is a view showing a cascade communication packet.

FIG. 9 is a view showing an exemplary communication packet 55. The communication packet 55 shown in FIG. 9 is a communication packet which is generated for distribution of the moving image data 50 with the file name "fileA.mpg". The communication packet 55 is constituted of a detection/synchronization code part 51, a destination address part 52, a payload part 53, and an error code part 54.

In the detection/synchronization code part 51, stored is code information used when the receiving-side image reproduction device 10a detects the communication packet 55. In the destination address part 52, set is the identifying information "10a" of the destination of the communication packet 55, i.e., the image reproduction device 10a. In the payload part 53, stored is the moving image data 50 to be distributed. Further, in the payload part 53, a control command for the image reproduction device 10, status information of the device, and the like can be stored, as well as the moving image data 50. In the error code part 54, stored is an error detection code used for detecting an error of the communication packet 55.

The management device 20 confirms that the communication packet 55 can be sent out ("Yes" in Step S13) and transmits the communication packet 55 to the image reproduction device 10a (Step S14). As a case where the communication packet 55 cannot be sent out, there is a case where the time slot is assigned to the broadcast communication, or the like. In this case, the management device 20 waits until the cascade communication can be performed and thereafter performs an operation of Step S14.

When the image reproduction device 10a receives the communication packet 55 shown in FIG. 9, the image reproduction device 10a stores the moving image data 50 stored in the communication packet 55 into the storage part 17. The image reproduction device 10a transmits a response to the communication packet 55 to the management device 20 by cascade communication.

When the management device 20 receives the response to the communication packet 55 from the image reproduction device 10a ("Yes" in Step S15), the management device 20 checks if the distribution of all the moving image data 50 is finished (Step S16). When the distribution of all the moving image data 50 is not finished ("No" in Step S16), the management device 20 returns the process to Step S11. On the other hand, when the distribution of all the moving image data 50 is finished ("Yes" in Step S16), the management device 20 ends the process shown in the flowchart of FIG. 7.

When the management device 20 finds that the distribution destination of the moving image data 50 with the file name "fileF.mpg" is the device itself in Step S11, the management device 20 does not perform the process steps S12 to S15. The management device 20 stores the moving image data 50 with the file name "fileF.mpg" into the storage part 17 thereof.

Thus, the management device 20 distributes the moving image data 50 stored in the memory card 45 by using the cascade communication which is one-to-one bidirectional communication. The management device 20 can reliably transmit the moving image data 50 to the distribution destination and can also confirm that the distribution destination has acquired the moving image data 50. Further, since it is not necessary to provide the image reproduction device 10 with any interface used for updating the moving image data 50 stored in the storage part 17, such as the memory card slot 26, it is possible to cut the cost for the image reproduction device 10.

The management device 20 may be provided with a general purpose communication module (LAN module or the like), instead of the memory card slot 26. In this case, a store salesperson may operate a PC to transmit the pieces of moving image data 50, 50, . . . , and the distribution destination information 46 to the management device 20.

(3) Instruction for Reproduction of Moving Image Data

Next, discussion will be made on an operation flow until the management device 20 and the image reproduction devices 10 start reproduction of the moving image data 50.

In order to reproduce the moving image data 50, the image reproduction devices 10 and the management device 20 need to start up the decoder 151. The respective starting times of the decoders 151 in the devices are different. In order for the devices to start the reproduction of the moving image data 50 at the same time, the management device 20 instructs the image reproduction devices 10 to go into a reproduction standby state. The reproduction standby state is a state in which the decoders 151 are up.

Specifically, the management device 20 sends a reproduction standby command instructing the image reproduction device 10 to go into the reproduction standby state to each of the image reproduction devices 10 by cascade communication. The process for sending the reproduction standby command is the same as that shown in the flowchart of FIG. 7. In the payload part 53 of the communication packet 55, stored is the reproduction standby command.

When the image reproduction device 10 receives the reproduction standby command, the image reproduction device 10 starts up the decoder 151 thereof and goes into the reproduction standby state. The image reproduction device 10 notifies the management device 20, by cascade communication, that the image reproduction device 10 has been in the reproduction standby state. The management device 20 also starts up the decoder 151 thereof and goes into the reproduction standby state.

After confirming that all the image reproduction devices 10 have been in the reproduction standby state, the management device 20 generates a broadcast packet 60 including a reproduction start command 61. The management device 20 sends the broadcast packet 60 to all the image reproduction devices 10 by broadcast communication at the same time.

Figure 10:
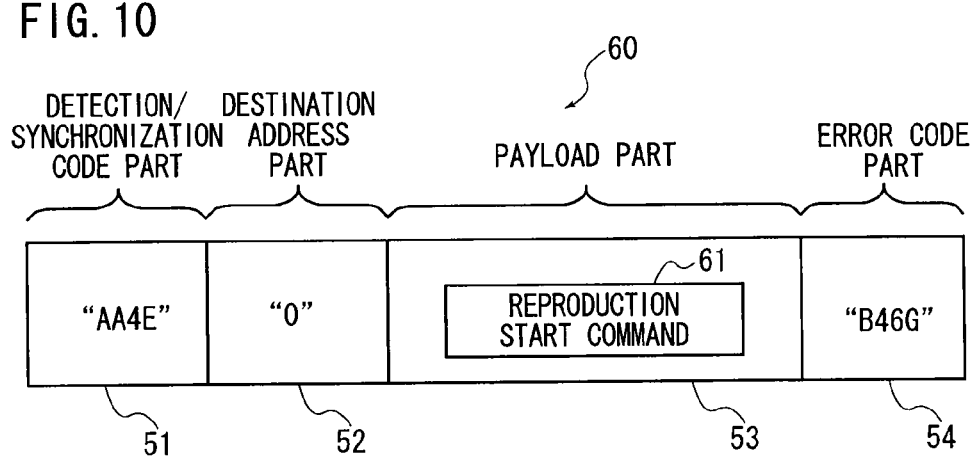
[FIG. 10] is a view showing a broadcast communication packet.

FIG. 10 is a view showing the broadcast communication packet 60. The broadcast packet 60 has the same constitution as that of the communication packet 55 used for the cascade communication. In the destination address part 52, however, set is "0" as an address used for the broadcast communication. In the payload part 53, stored is the reproduction start command 61.

The image reproduction device 10, receiving the broadcast packet 60, starts the reproduction of the moving image data 50 on the basis of the reproduction start command 61. After sending the broadcast packet 60, the management device 20 starts the reproduction of the moving image data 50. On starting the reproduction of the moving image data 50, the respective cumulative counter parts 153 of the image reproduction devices 10 and the management device 20 start counting the clock signal.

The timing at which all the image reproduction devices 10 receive the broadcast packet 60 and start the reproduction of the moving image data 50 is almost the same as the timing at which the management device 20 starts the reproduction of the moving image data 50. Therefore, the image reproduction devices 10 and the management device 20 start the reproduction of the moving image data 50 at the same time.

(4) Synchronized Display of Moving Image Data 50

After instructing the image reproduction devices 10 to start the reproduction, the management device 20 periodically sends the synchronization information 252 by broadcast communication.

The panel control part 16 of the management device 20 updates the frame to be displayed on the display part 210 thereof. The synchronization information transmitting part 251 records the cumulative count value of the cumulative counter part 153 at the timing for updating the frame, as the reference count information 253. The synchronization information transmitting part 251 periodically generates the synchronization information 252 including the reference count information 253 and the time stamp indicating the last frame update time and broadcasts the generated synchronization information 252 to the image reproduction devices 10.

The time interval for broadcasting the synchronization information 252 is not particularly defined. It is preferable, however, that the management device 20 should broadcast a plurality of pieces of synchronization information 252 per second. Since the difference in the frame number among the image reproduction devices 10 and the management device 20 can be thereby kept very small, it is possible to continuously display a unified video image on the whole of the display rack 4.

When the image reproduction device 10 receives the synchronization information 252 during the reproduction of the moving image data 50, the image reproduction device 10 adjusts the frame to be displayed on the display part 110 thereof on the basis of the synchronization information 252.

Figure 11:
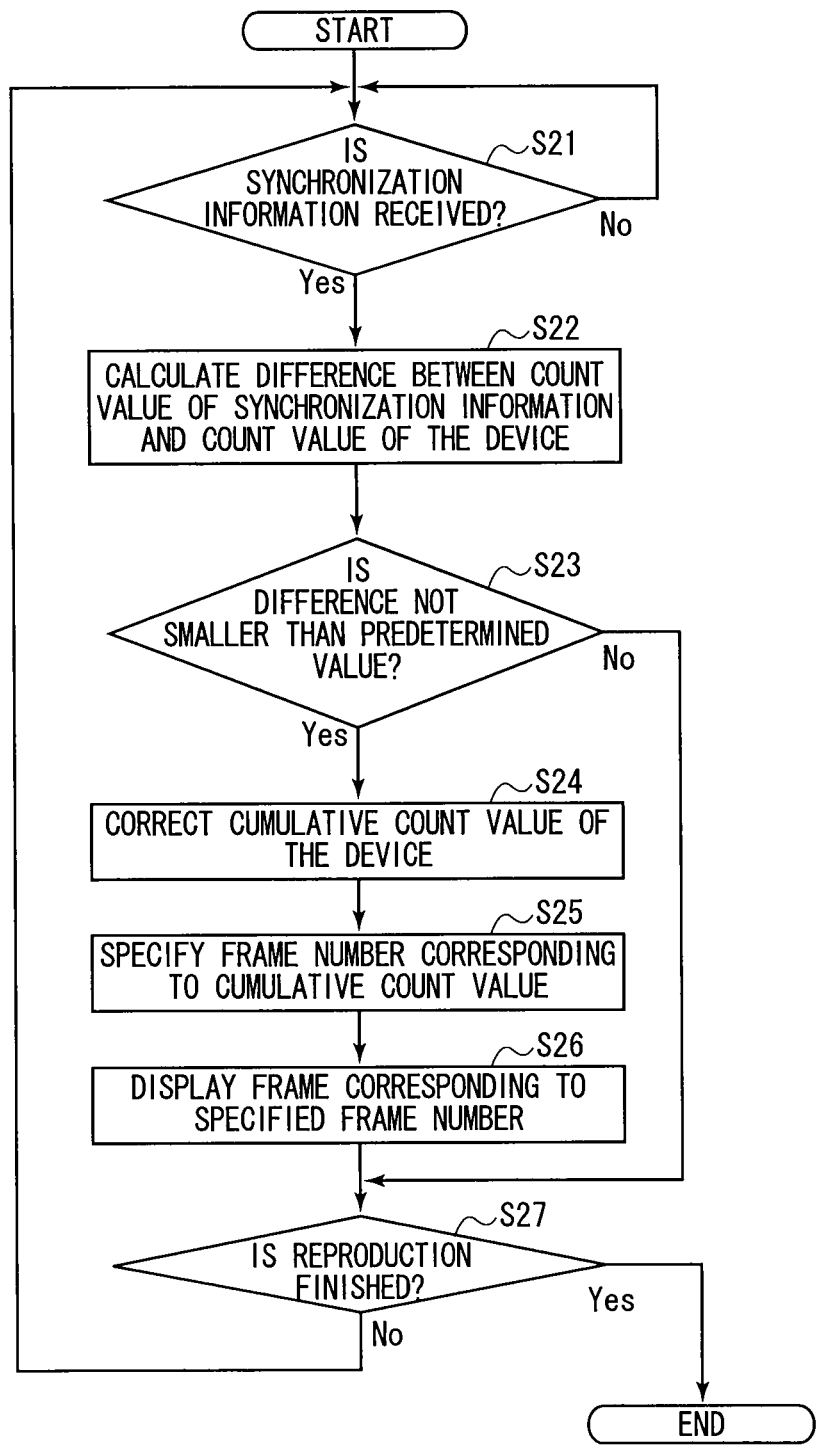
[FIG. 11] is a flowchart showing an operation flow for adjusting a frame to be displayed on a display part by using synchronization information.

FIG. 11 is a flowchart showing an operation flow of the image reproduction device 10 for adjusting the frame to be displayed on the display part 110 thereof by using the synchronization information 252. The image reproduction device 10 performs an operation shown in the flowchart of FIG. 11 concurrently with the reproduction of the moving image data 50.

When the synchronization information 252 is received ("Yes" in Step S21), the frame adjustment part 154 calculates a difference between the count value of the reference count information 253 included in the synchronization information 252 and the count value of the cumulative count information 155 (Step S22).

When the difference obtained in Step S22 is not smaller than a threshold value ("Yes" in Step S23), the frame adjustment part 154 rewrites the cumulative count value and the count value of the cumulative count information 155 by using the count value of the reference count information 253 (Step S24). Then, the frame adjustment part 154 specifies a frame number corresponding to the rewritten count value of the cumulative count information 155 (Step S25).

For example, the frame number can be specified by dividing the count value of the cumulative count information 155 by the update count value indicating the time interval for updating the frame. In a case where the count value of the cumulative count information 155 is "3687" and the update count value is "242, the quotient is "153.625". As a result, the frame adjustment part 154 specifies "153" as the frame number.

The frame adjustment part 154 notifies the panel control part 16 of the specified frame number. The panel control part 16 displays a frame corresponding to the notified frame number on the display part 110 (Step S26). As a result, the frame numbers of the frames displayed on the image reproduction devices 10 are synchronized with the frame number of the frame displayed on the management device 20.

The timings at which the image reproduction devices 10 receive the synchronization information 252 are almost the same. For this reason, the adjustments of the frames to be displayed on the image reproduction devices 10, on the basis of the synchronization information 252, are performed at almost the same timing. As a result, the frame numbers of the frames displayed on the image reproduction devices 10 and the management device 20 are synchronized with one another. As shown in FIG. 4C, it is possible to display a video image with a sense of unity on the whole of the display rack 4.

When the difference is smaller than the threshold value in Step S23 ("No" in Step S23), the frame adjustment part 154 does not notify the panel control part 16 of the frame number. In other words, the panel control part 16 displays the frame on the display part 110 in the order of the frame number. Since whether the frame should be changed or not is determined on the basis of the difference, the image reproduction device 10 does not need to change the frame to be displayed every time when the image reproduction device 10 receives the synchronization information 252. Therefore, it is possible to reduce the load of the image reproduction device 10.

When the reproduction of the moving image data 50 is finished ("Yes" in Step S27), the image reproduction device 10 ends the process shown in the flowchart of FIG. 11. Further, the image reproduction device 10 may end the process of FIG. 11 also when the image reproduction device 10 receives a reproduction end command from the management device 20.

Since the image reproduction devices 10 and the management device 20 individually reproduce the moving image data 50, the display system 1 does not have to distribute the frame to the image reproduction devices 10 and the management device 20. Therefore, it is possible to simplify the configuration of the display system 1 and lower the price. Further, the data size of the synchronization information 252 is much smaller than that of the frame which is distributed by the content reproduction device. For this reason, since data transfer can be performed by using RS-485 or the like with relatively low data transfer rate, it is possible to further lower the cost.

The image reproduction device 10 continues to reproduce the moving image data 50 when the image reproduction device 10 does not receive the synchronization information 252. Therefore, a video image is continuously displayed on the whole of the display rack 4 even when the synchronization information 252 is not broadcasted because of a breakdown of the management device 20, or the like. Similarly, even when a situation occurs where any one of the image reproduction devices 10 and the management device 20 cannot display any video image, the other devices continue to reproduce the moving image data 50. Thus, in the display system 1, it is possible to prevent occurrence of a situation where no video image can be displayed on the whole of the display rack 4 even when a particular device is out of order.

Further, even when a situation occurs where the synchronization of the frame numbers cannot be performed by using the synchronization information 252, only if the difference in the frame number among the image reproduction devices 10 and the management device 20 is about several frames, it is possible to maintain a video image with a sense of unity to be displayed on the whole of the display rack 4.

Thus, in the display system 1 of the preferred embodiment, one video image is displayed on the whole of the display system 1 by causing the image reproduction devices 10 and the management device 20 to individually reproduce the moving image data 50. The management device 20 distributes the moving image data 50 to the image reproduction devices 20 by cascade communication and sends the synchronization information 252 to the image reproduction devices 10 by broadcast communication. Since this eliminates the necessity of providing the content reproduction device for distributing the frames, it is possible to simplify the configuration of the display system 1.

Though discussion has been made on the operation of rewriting the cumulative count value and the cumulative count information 155 (Step S24) when the difference is not smaller than the threshold value ("Yes" in Step S23) in the process shown in the flowchart of FIG. 11 in the preferred embodiment, this is only one exemplary case. For example, in a case where the crystal oscillator is a PLL (Phased Locked Loop) circuit, the image reproduction devices 10 may correct the frequency of the clock signal outputted from the PLL circuit so that the count value of the cumulative count information 155 may be coincident with the count value of the reference count information 253.

Though discussion has been made on the case where the management device 20 generates the synchronization information 252 including the reference count information 253 in the preferred embodiment, this is only one exemplary case. The management device 20 may generate the synchronization information 252 by using information indicating the frame number of the frame displayed on the display part 210, instead of the reference count information 253.

If the format of the moving image data 50 is MPEG, the management device 20 may generate the synchronization information 252 by using a value of an STC (System Time Clock), instead of the reference count information 253. In this case, the cumulative counter part 153 corresponds to the STC. The image reproduction device 10 corrects the value of the STC thereof on the basis of the value of the STC included in the synchronization information 252 and adjusts the timing for displaying the frame and the timing for decoding, by using the corrected value of the STC. The management device 20 needs to synchronize the STCs of the image reproduction devices 10 and the management device 20 before the reproduction of the moving image data 50 is started.

Though discussion has been made on the case where the management device 20 broadcasts the synchronization information 252 in the preferred embodiment, this is only one exemplary case. When a state where the synchronization information 252 cannot be received from the management device 20 continues for a predetermined time period, any one of the image reproduction devices 10, instead of the management device 20, may send the synchronization information 252. For example, the image reproduction device 10 may automatically determine whether the synchronization information 252 should be broadcasted or not. Alternatively, the image reproduction device 10 may be provided with a switch indicating On/Off of the function of sending the synchronization information 252.

Figure 12:
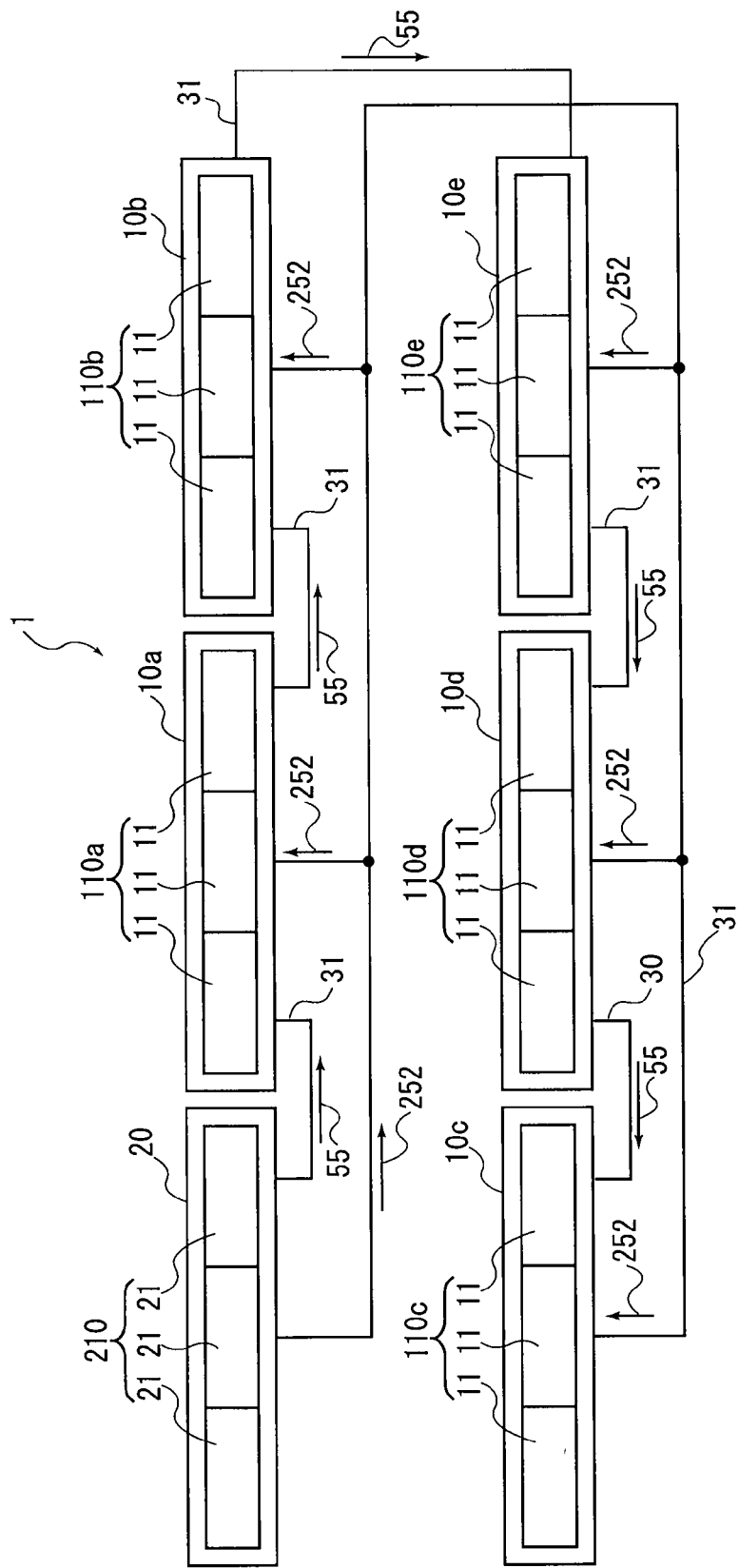
[FIG. 12] is a schematic diagram showing another exemplary configuration of the display system.

Though discussion has been made on the case where the cascade communication and the broadcast communication are performed by using the communication cable 30 in the preferred embodiment, this is only one exemplary case. As shown in FIG. 12, the display system 1 may comprise communication cables 31, 31, . . . for cascade communication. In this case, the communication cable 30 is used for broadcast communication. Since the management device 20 does not need to perform time sharing management for the cascade communication and the broadcast communication, it is possible to reduce the load of the management device 20.

One of the communication cables 31 for cascade communication connects the management device 20 and the image reproduction device 10a to each other. Another one of the communication cables 31 connects the image reproduction device 10a and the image reproduction device 10b to each other. Still another one of the communication cables 31 connects the image reproduction device 10b and the image reproduction device 10c to each other. Still another one of the communication cables 31 connects the image reproduction device 10c and the image reproduction device 10d to each other. Yet another one of the communication cables 31 connects the image reproduction device 10d and the image reproduction device 10e to each other.

When the cascade communication is used for transmission, the management device 20 transmits the communication packet 55 to the image reproduction device 10a via the communication cable 31. When the distribution destination of the received communication packet 55 is not this device, the image reproduction device 10a transmits the communication packet 55 to the image reproduction device 10b via the communication cable 31. Thus, when the image reproduction device 10 receives the communication packet 55 whose destination is not this device, the image reproduction device 10 transmits the communication packet 55 to the next image reproduction device 10. When the image reproduction device 10 receives the communication packet 55 whose destination is this device, the image reproduction device 10 performs reception of the communication packet 55.

While the invention has been shown and described in detail, the foregoing description is in all aspects illustrative and not restrictive. It is therefore understood that numerous modifications and variations can be devised without departing from the scope of the invention.

The invention claimed is:

1. A display system, including:
a first image reproduction device for reproducing first moving image data; and
a second image reproduction device for reproducing second moving image data, which can be communicated with said first image reproduction device,
wherein said first image reproduction device and said second image reproduction device each comprise:
a storage part for storing therein moving image data to be reproduced by said device itself;
a decoder for decoding said moving image data stored in said storage part, to thereby generate a frame; and
a display part for displaying said frame thereon in the order of frame number,
wherein said second image reproduction device further comprises:
a synchronization information transmitting part for transmitting synchronization information including information specifying a frame number of a reference frame displayed on said display part of said second image reproduction device to said first image reproduction device by unidirectional communication,
and wherein said first image reproduction device further comprises:
a frame adjustment part for specifying said frame number of said reference frame on the basis of said synchronization information when the synchronization information is received from the second image reproduction device via said unidirectional communication and displaying said frame on said display part in the order of frame number beginning from the specified frame number.

2. The display system according to claim 1, further including:
a third image reproduction device for reproducing third moving image data,
wherein said synchronization information transmitting part includes:
a broadcast communication part for broadcasting said synchronization information to said first image reproduction device and said third image reproduction device by unidirectional communication.

3. The display system according to claim 1, wherein
said first moving image data and said second moving image data are pieces of divided moving image data into which one moving image data is divided, being different from each other.

4. The display system according to claim 1, wherein
said information specifying said frame number is a frame number of said reference frame.

5. The display system according to claim 1, wherein
said second image reproduction device further comprises:
a first clock generation part for generating a first clock signal; and
a first counter part for counting said first clock signal from the time when reproduction of said second moving image data is started,
and wherein said information specifying said frame number is a count value of said first clock signal corresponding to a timing at which said reference frame is displayed on said display part of said second image reproduction device, and
said frame adjustment part specifies said frame number of said reference frame from said count value of said first clock signal which is included in said synchronization information.

6. The display system according to claim 5, wherein
said first image reproduction device further comprises:
a second clock generation part for generating a second clock signal; and
a second counter part for counting said second clock signal from the time when reproduction of said first moving image data is started,
and wherein said frame adjustment part displays a frame corresponding to said frame number specified thus on said display part when a difference between a count value of said second clock signal and said count value of said first clock signal which is included in said synchronization information is not smaller than a predetermined value.

7. The display system according to claim 2, wherein
said first image reproduction device further comprises:
an alternative synchronization information transmitting part for generating alternative synchronization information including information specifying a frame number of a frame displayed on said display part of said device when said synchronization information cannot be received for a predetermined time period and transmitting said alternative synchronization information to said third image reproduction device by unidirectional communication.

8. The display system according to claim 1, wherein
said second image reproduction device further comprises:
an individual communication part for instructing said first image reproduction device to go into a reproduction standby state in which said first moving image data can be reproduced, by one-to-one communication;
a transition part for bringing said decoder and said display part of said device into a state in which said second moving image data can be reproduced; and
a reproduction instruction part for instructing said first image reproduction device to start reproduction of said first moving image data by unidirectional communication and instructing said decoder and said display part of said device to start reproduction of said second moving image data, when information indicating that said first image reproduction device has been in a reproduction standby state is received from said first image reproduction device.

9. The display system according to claim 1, wherein said second image reproduction device further comprises:
- an input part for inputting a plurality of pieces of inputted moving image data and distribution destination information indicating a distribution destination of each inputted moving image data from the outside; and
- a distribution part for storing said inputted moving image data for said device into said storage part and distributing said inputted moving image data for said first image reproduction device to said first image reproduction device by one-to-one communication, on the basis of said distribution destination information.

10. An image reproduction device connected to a first display device for displaying first moving image data thereon, comprising:
- a storage part for storing second moving image data therein;
- a decoder for decoding said second moving image data stored in said storage part, to thereby generate a frame;
- a display part for displaying said frame thereon in the order of frame number; and
- a synchronization information transmitting part for transmitting synchronization information including information specifying a frame number of a reference frame displayed on said display part to said first display device by unidirectional communication, wherein
- said first display device specifies said frame number of said reference frame on the basis of said synchronization information when the synchronization information is received from the image reproduction device via said unidirectional communication and displays said frame in the order of frame number beginning from the specified frame number.

11. The image reproduction device according to claim 10, wherein
- said synchronization information transmitting part includes:
- a broadcast communication part for broadcasting said synchronization information to said first display device and a second display device when said device is connected to said second display device for displaying third moving image data thereon.

12. An image reproduction device connected to a display device for displaying first moving image data thereon, comprising:
- a storage part for storing second moving image data therein;
- a decoder for decoding said second moving image data stored in said storage part, to thereby generate a frame;
- a display part for displaying said frame thereon in the order of frame number; and
- a frame adjustment part for specifying a frame number of a reference frame displayed on said display device on the basis of synchronization information when said synchronization information including information specifying said frame number of said reference frame is received from the display device via unidirectional communication and displaying said frame on said display part in the order of frame number beginning from the specified frame number.

* * * * *